US010017680B2

(12) United States Patent
Zhou et al.

(10) Patent No.: US 10,017,680 B2
(45) Date of Patent: Jul. 10, 2018

(54) CROSSLINKED N-VINYLPYRROLIDONE POLYMERS FOR USE IN SUBTERRANEAN FORMATIONS AND WELLS

(71) Applicant: Halliburton Energy Services, Inc., Houston, TX (US)

(72) Inventors: Hui Zhou, The Woodlands, TX (US); Jay Paul Deville, Spring, TX (US); Chesnee Lae Davis, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 154 days.

(21) Appl. No.: 14/461,060

(22) Filed: Aug. 15, 2014

(65) Prior Publication Data

US 2015/0000985 A1 Jan. 1, 2015

Related U.S. Application Data (63) Continuation-in-part of application No. 13/927,425, filed on Jun. 26, 2013.

(51) Int. Cl.
  *C09K 8/512* (2006.01)
  *E21B 21/00* (2006.01)
  *C09K 8/508* (2006.01)

(52) U.S. Cl.
  CPC ............ *C09K 8/512* (2013.01); *C09K 8/5083* (2013.01); *E21B 21/00* (2013.01)

(58) Field of Classification Search
  None
  See application file for complete search history.

(56) References Cited

U.S. PATENT DOCUMENTS 4,066,583 A   1/1978 Spaulding
4,471,097 A   9/1984 Uhl et al.
(Continued)

FOREIGN PATENT DOCUMENTS

WO   2007059857 A1   5/2007
WO   2012150431 A1   11/2012
(Continued)

OTHER PUBLICATIONS

Official Action issued in related Danish application No. 17/11/2015, dated Mar. 17, 2016 (8 pages).
(Continued)

*Primary Examiner* — Jeffrey Washville
(74) *Attorney, Agent, or Firm* — Tenley Krueger; Baker Botts L.L.P.

(57) ABSTRACT

Crosslinked polymers that may be useful, for example, as viscosifiers or fluid-loss control additives for well treatment and servicing fluids are provided. In one embodiment, the methods comprise: providing a treatment fluid comprising a base fluid and a crosslinked polymer composition comprising at least one polymer that comprise at least one N-vinyl lactam monomeric unit, and at least one crosslinker selected from the group consisting of: an acrylamide-based crosslinker, an acrylate-based crosslinker, an ester-based crosslinker, an amide-based crosslinker, any derivative thereof, and any combination thereof; and introducing the treatment fluid into at least a portion of a wellbore penetrating at least a portion of a subterranean formation.

11 Claims, 1 Drawing Sheet

(56) References Cited

U.S. PATENT DOCUMENTS

| | | | |
|---|---|---|---|
| 4,792,412 A | 12/1988 | Heilweil | |
| 5,620,947 A | 4/1997 | Elward-Berry | |
| 6,465,397 B1 | 10/2002 | Patterson | |
| 7,651,980 B2 | 1/2010 | Jarrett et al. | |
| 8,343,896 B2 | 1/2013 | Eoff et al. | |
| 2003/0162925 A1 | 8/2003 | Miller et al. | |
| 2003/0213593 A1 | 11/2003 | Bouwmeester et al. | |
| 2004/0229755 A1 | 11/2004 | Thaemlitz | |
| 2005/0080176 A1 | 4/2005 | Robb | |
| 2005/0130846 A1* | 6/2005 | Benton | C08K 5/098 507/122 |
| 2007/0054811 A1 | 3/2007 | Reddy et al. | |
| 2008/0004188 A1 | 1/2008 | Heidlas et al. | |
| 2008/0135302 A1* | 6/2008 | Zhang | C09K 8/36 175/70 |
| 2008/0223596 A1 | 9/2008 | Ezell et al. | |
| 2011/0237468 A1 | 9/2011 | Reichenbach-Klinke et al. | |
| 2012/0285688 A1 | 11/2012 | Phatak et al. | |
| 2013/0105161 A1 | 5/2013 | Funkhouser et al. | |
| 2014/0348887 A1* | 11/2014 | Hsu | C09K 8/035 424/401 |
| 2015/0021098 A1* | 1/2015 | Kippie | C09K 8/506 175/72 |

FOREIGN PATENT DOCUMENTS

| | | |
|---|---|---|
| WO | 2013040167 A1 | 3/2013 |
| WO | 2013040178 A1 | 3/2013 |

OTHER PUBLICATIONS

International Search Report and Written Opinion issued in related PCT Application No. PCT/US2014/033591, dated Aug. 22, 2014 (14 pages).

International Preliminary Report on Patentability issued in related PCT Application No. PCT/US2014/033591 dated Jan. 7, 2016 (11 pages).

* cited by examiner

CROSSLINKED N-VINYLPYRROLIDONE POLYMERS FOR USE IN SUBTERRANEAN FORMATIONS AND WELLS

CROSS-REFERENCE TO RELATED APPLICATIONS

This application is a continuation-in-part of U.S. patent application Ser. No. 13/927,425, entitled "High-Temperature Crosslinked Polymer for Use in a Well," filed on Jun. 26, 2013.

BACKGROUND

The present disclosure relates to compositions and methods for use in subterranean formations.

To produce oil, gas, or other fluids from a subterranean formation, a wellbore is typically drilled in or near the formation. The "borehole" usually refers to the inside wellbore wall, that is, the rock surface or wall that bounds the drilled hole. A drilling fluid, or "mud" which a drilling fluid is also often called, is a specially designed fluid that is circulated in a well bore as the well bore is being drilled to facilitate the drilling operation. The various functions of a drilling fluid include removing drill cuttings from the well bore, cooling and lubricating the drill bit, aiding in support of the drill pipe and drill bit, and providing a hydrostatic head to maintain the integrity of the well bore walls and prevent well blowouts.

A "well" typically includes a wellhead and at least one wellbore from the wellhead penetrating the earth. The "wellhead" is the surface termination of a wellbore, which surface may be on land or on a seabed. A wellbore can be used as a production or injection wellbore. Well treatments and services often include a wide variety of operations that may be performed in oil, gas, geothermal, or water wells, including but not limited to drilling, cementing, completion, and intervention. Specific well service or treatment fluid systems are often selected to optimize the well treatments or services in accordance with the characteristics of a particular geological formation. As used herein, the word "treatment" refers to any treatment for changing a condition of a portion of a wellbore or a subterranean formation adjacent a wellbore; however, the word "treatment" does not necessarily imply any particular treatment purpose. A treatment usually involves introducing a fluid for the treatment, in which case it may be referred to as a treatment fluid, into a well. As used herein, a "treatment fluid" is a fluid used in a treatment. The word "treatment" in the term "treatment fluid" does not necessarily imply any particular treatment or action by the fluid.

A treatment fluid typically comprises water and/or oil, synthetic oil, or other synthetic material or fluid as a base fluid. A number of additives may be included in such drilling fluids to improve certain properties of the fluid. Such additives may include, for example, emulsifiers, weighting agents, fluid-loss additives or fluid-loss control agents, viscosifiers or viscosity control agents, and alkali. Fluid loss typically refers to the undesirable leakage of a fluid phase of any type of fluid into the permeable matrix of a zone, which zone may or may not be a treatment zone. Fluid-loss control refers to treatments, additives, and/or materials designed or used to reduce such undesirable leakage.

SUMMARY

The present disclosure relates to compositions and methods for use in subterranean formations, and more specifically, to crosslinked polymers that may be useful, for example, as viscosifiers or fluid-loss control additives for well treatment and servicing fluids.

In one embodiment, the present disclosure provides methods comprising: introducing a treatment fluid into at least a portion of a wellbore penetrating at least a portion of a subterranean formation, the treatment fluid comprising: at least one polymer that comprise at least one N-vinyl lactam monomeric unit, and at least one crosslinker selected from the group consisting of: an acrylamide-based crosslinker, an acrylate-based crosslinker, an ester-based crosslinker, an amide-based crosslinker, any derivative thereof, and any combination thereof.

In another embodiment, the present disclosure provides methods comprising: providing a drilling fluid that comprise a base fluid and a crosslinked polymer composition comprising at least one polymer that comprise at least one N-vinyl lactam monomeric unit, and at least one crosslinker selected from the group consisting of: an acrylamide-based crosslinker, an acrylate-based crosslinker, an ester-based crosslinker, an amide-based crosslinker, any derivative thereof, and any combination thereof; and using the drilling fluid to drill at least a portion of a well bore penetrating at least a portion of a subterranean formation.

In another embodiment, the present disclosure provides treatment fluids comprising: a base fluid comprising a halide-based brine; and a crosslinked polymer comprising: at least one N-vinyl lactam monomeric unit, and at least one crosslinker selected from the group consisting of an acrylamide-based crosslinker, an acrylate-based crosslinker, an ester-based crosslinker, an amide-based crosslinker, any derivative thereof, and any combination thereof.

The features and advantages of the methods, compositions, and systems of the present disclosure will be readily apparent to those skilled in the art. While numerous changes may be made by those skilled in the art, such changes are within the scope and spirit of the disclosure and claims.

BRIEF DESCRIPTION OF THE FIGURES

These drawings illustrate certain aspects of some of the embodiments of the present disclosure, and should not be used to limit or define the disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to compositions and methods for use in subterranean formations, and more specifically, crosslinked polymers that may be useful, for example, as viscosifiers or fluid-loss control additives for well treatment and servicing fluids.

The methods and compositions of the present disclosure generally involve crosslinked polymer compositions comprising (a) one or more polymers that comprise at least one N-vinyl lactam monomeric unit and (b) a crosslinker. The treatment fluids of the present disclosure generally comprise a base fluid and a crosslinked polymer composition as described above. The methods and compositions of the present disclosure may be used in any operation or treatment in a subterranean formation (e.g., a well bore penetrating at least a portion of a subterranean formation), but are generally used in conjunction with subterranean drilling operations. In certain embodiments, the methods of the present disclosure may comprise providing a treatment fluid comprising a base fluid and a crosslinked polymer composition comprising at least one polymer that comprise at least one N-vinyl lactam monomeric unit, and at least one crosslinker selected from the group consisting of: an acrylamide-based crosslinker, an acrylate-based crosslinker, an ester-based crosslinker, an amide-based crosslinker, any derivative thereof, and any combination thereof, and introducing the treatment fluid into at least a portion of a wellbore penetrating at least a portion of a subterranean formation.

The methods and compositions of the present disclosure may exhibit and/or provide, among other benefits and properties, improved viscosity, solids suspension, and/or fluid loss control under wellbore conditions (e.g., temperatures of up to about 300° F.) for extended periods of time. For example, a treatment fluid of the present disclosure may be capable of maintaining desired viscosity and fluid-loss control at temperatures of about 300° F. for about 48 hours. In certain embodiments, the methods and compositions of the present disclosure may provide such benefits and/or rheological properties without the need for clay-based fluid additives in the fluid. For example, in certain embodiments, the treatment fluids of the present disclosure may comprise less than 2% by weight of clay-based additives.

Without being limited by any hypothetical explanation or mechanism, it is believed acrylamide monomers and derivatives thereof tend to hydrolyze at elevated temperatures, causing a homopolymer of such monomers to become less effective as a viscosifier in certain types of fluids (e.g., brines such as divalent brines), and even causing the hydrolyzed polymeric material to precipitate from the aqueous phase in some cases. The inclusion of an N-vinyl lactam as a monomeric unit may, among other benefits, provide a polymer that is more thermally stable than a homopolymer of acrylamide or derivative thereof. Without being limited by any hypothetical explanation or mechanism, it is believed an N-vinyl lactam monomeric unit helps reduce the hydrolysis of the acrylamide group. This may be due to stearic blocking of the acrylamide group. Even though part of the acrylamide group is hydrolyzed, the N-vinyl lactam monomeric unit in the polymer may keep the polymer from precipitating out from the solution, which may help maintain desired rheological properties of the fluid.

The polymers used in the methods and compositions of the present disclosure may comprise any polymeric material that comprises at least one N-vinyl lactam monomeric unit, such as N-vinylpyrrolidone, N-vinylcaprolactam, or derivatives thereof. As used herein, "derivative" means a chemical compound formed by a chemical process from a parent compound, wherein the chemical backbone skeleton of the parent compound is retained in the derivative. The chemical process preferably includes at most a few chemical reaction steps, and more preferably only one or two chemical reaction steps. Such polymers may be homopolymers (e.g., polyvinylpyrrolidone (PVP)) or copolymers, terpolymers, tetrapolymers, etc. of one or more N-vinyl lactam monomers with one or other monomers. In certain embodiments, the N-vinyl lactam monomeric units comprise at least about 5 mol % of the monomeric units of the polymer. In certain embodiments, the N-vinyl lactam monomeric units comprise about 30 mol % to about 100% of the monomeric units of the polymer. In certain embodiments, the additional monomers may comprise about 0.1 mol % to about 90 mol % of the monomeric units of the polymer. In certain embodiments, the additional monomers may comprise about 0.1 mol % to about 70 mol % of the monomeric units of the polymer. The additional monomers may include, but are not limited to acrylamide, N-substituted acrylamides (such as 2-acrylamido-2-methylpropanesulfonic acid (AMPS), N-ethylacrylamide, N-isopropylacrylamide, N,N-dimethylacrylamide, N-hydroxyethylacrylamide, and, dimethylaminopropyl acrylamide), methacrylamide, N-substituted methacrylamides (such as dimethylaminopropyl methacrylamide), acrylates (such as methyl acrylate and hydroxyethyl acrylate), methacrylates (such as methyl methacrylate, 2-hydroxyethyl methacrylate, and 2-dimethylaminoethyl methacrylate), acrylic acid, methacrylic acid, N-vinylamides (such as N-vinylformamide, N-vinylacetamide, and N-methyl-N-vinylacetamide), N-allylamides, vinyl alcohol, vinyl ethers (such as vinyl ethyl ether, ethylene glycol monovinyl ether, polyethylene glycol monovinyl ether, and glycerol monovinyl ether), vinyl esters (such as vinyl acetate), allyl alcohol, allyl ethers (such as sodium 3-allyloxy-2-hydroxypropane-1-sulfonate, glycerol monoallyl ether, ethylene glycol monoallyl ether, and polyethylene glycol monoallyl ether), allyl esters (such as allyl acetate), vinylpyridine, vinyl sulfonates, allyl sulfonates, vinylimidazole, allylimidazole, and diallyldimethylammonium chloride.

The crosslinkers used in the methods and compositions of the present disclosure generally comprise one or more of the following crosslinkers: acrylamide-based crosslinkers, acrylate-based crosslinkers, ester-based crosslinkers, amide-based crosslinkers, any derivatives thereof, and any combinations thereof. In certain embodiments, the acrylamide-based crosslinkers may be monomers with at least one acrylamide or methacrylamide group, which may also contain additional unsaturated groups such as vinyl, allyl, and/or acetylenic groups. In certain embodiments, the acrylate-based crosslinkers may be monomers with at least one acrylate or methacrylate group, which may also contain additional unsaturated groups such as vinyl, allyl, and/or acetylenic groups. These crosslinkers may be used alone or in combination with one or more additional crosslinkers, including but not limited to one or more of the following crosslinkers: divinyl ether, diallyl ether, vinyl or allyl ethers of polyglycols or polyols (such as pentaerythritol allyl ether (PAE), allyl sucrose, ethylene glycol divinyl ether, triethylene glycol divinyl ether, diethylene glycol divinyl ether, glycerol diallyl ether, and polyethylene glycol divinyl ether, propylene glycol divinyl ether, and trimethylolpropane diallyl ether), divinylbenzene, 1,3-divinylimidazolidin-2-one (also known as 1,3-divinylethyleneurea or divinylimidazolidone), divinyltetrahydropyrimidin-2(1H)-one, dienes (such as 1,7-octadiene and 1,9-decadiene), allyl amines (such as triallylamine and tetraallylethylene diamine), N-vinyl-3(E)-ethylidene pyrrolidone, ethylidene bis(N-vinylpyrrolidone), and any combination of any of the foregoing.

Examples of acrylamide-based crosslinkers that may be suitable in certain embodiments of the present disclosure include, but are not limited to, N,N'-methylenebisacrylamide, N,N'-methylenebismethacrylamide, N,N'-ethylenebisacrylamide, N,N'-(1,2-dihydroxyethylene)bisacrylamide, 1,4-diacryloylpiperazine, N,N-diallylacrylamide, and 1,3,5-triacryloylhexahydro-1,3,5-triazine. Examples of acrylate-based crosslinkers that may be suitable in certain embodiments of the present disclosure include, but are not limited to, ethylene glycol di(meth)acrylate, propylene glycol di(meth)acrylate, diethylene glycol di(meth)acrylate, polyethylene glycol di(meth)acrylate, 1,4-butanediol di(meth)acrylate, 1,6-hexanediol di(meth)acrylate, 1,1,1-trimethylolpropane trimethacrylate, pentaerythritol tri(meth)acrylate, pentaerythritol tetra(meth)acrylate, glycerol di(meth)acrylate, glycerol tri(meth)acrylate, triglycerol di(meth)acrylate, allyl (meth)acrylate, vinyl (meth)acrylate, tris[2-(acryloyloxy)ethyl]isocyanurate. Examples of ester-based and amide-based crosslinkers that may be suitable in certain embodiments of the present disclosure include, but are not limited to, vinyl or allyl esters (such as diallyl carbonate, divinyl adepate, divinyl sebacate, diallyl phthalate, diallyl maleate, diallyl succinate), 1,3,5-triallyl-1,3-5-triazine-2,4,6(1H,3H,5H)-trione, and triallyl cyanurate.

In certain embodiments, the crosslinker may be present in a concentration of from about 0.05 mol % to 5 mol % of a total of the monomeric units of the polymer. In certain embodiments, the crosslinker may be present in a concentration of from about 0.1 mol % to 3 mol % of a total of the first and first monomeric units.

The treatment fluids of the present disclosure generally comprise a base fluid, which may comprise any fluid known in the art, including aqueous fluids, non-aqueous fluids, gases, or any combination thereof. Aqueous fluids that may be suitable for use in the methods and systems of the present disclosure may comprise water from any source, provided that it does not contain compounds that adversely affect other components of the fracturing fluid. Such aqueous fluids may comprise fresh water, salt water (e.g., water containing one or more salts dissolved therein), brine, salt water, seawater, or any combination thereof. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of gelling agents, acids, and other additives included in the fluid. One of ordinary skill in the art, with the benefit of this disclosure, will recognize when such density and/or pH adjustments are appropriate. Examples of non-aqueous fluids that may be suitable for use in the methods and systems of the present disclosure include, but are not limited to, oils, hydrocarbons, organic liquids, alcohols, (e.g., glycols), polar solvents, and the like. In certain embodiments, the fracturing fluids may comprise a mixture of one or more fluids and/or gases, including but not limited to emulsions, foams, and the like.

In certain embodiments, an aqueous base fluid according to the present disclosure may comprise water with one or more water-soluble salts dissolved therein. In certain embodiments of the present disclosure, the one or more salts can be selected from the group of inorganic salts, formate salts, or any combination thereof. Inorganic salts can be selected from the group of monovalent salts, which can be further selected from the group consisting of: alkali metal halides, ammonium halides, and any combination thereof. Inorganic salts can also be selected from the group of divalent salts, such as alkaline earth metal halides (e.g., $CaCl_2$, $CaBr_2$, etc.) and zinc halides. Brines comprising such divalent salts may be referred to as "divalent brines." Monovalent salts can be used to form drilling or treatment fluids having an aqueous phase having a density up to about 12.5 lb/gal. Brines comprising monovalent salts may be referred to as "monovalent brines." Brines comprising halide-based salts may be referred to as "halide-based brines." Divalent salts and formate salts can be used to form treatment fluids having an aqueous phase having a density up to about 19.2 lb/gal. In various embodiments, the one or more inorganic salts are in a sufficient concentration such that the density of the aqueous phase is in the range of about 9 lb/gal to about 19.2 lb/gal. In some embodiments according to the present disclosure, the one or more inorganic salts are selected and in a sufficient concentration such that the density of the aqueous phase is greater than about 9.5 lb/gal. In some embodiments according to the present disclosure, the one or more inorganic salts are selected and in a sufficient concentration such that the density of the aqueous phase is greater than about 13 lb/gal.

The treatment fluids of the present disclosure optionally may comprise any number of additional additives in combination with the crosslinked polymer composition. Other examples of such additional additives include, but are not limited to, weighting agents, surfactants, emulsifiers, acids, fluorides, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, dispersants, flocculants, additional $H_2S$ scavengers, $CO_2$ scavengers, oxygen scavengers, lubricants, viscosifiers, breakers, relative permeability modifiers, resins, particulate materials (e.g., proppant particulates), wetting agents, coating enhancement agents, filter cake removal agents, additional viscosifying agents, and the like. One or more of these additives (e.g., bridging agents) may comprise degradable materials that are capable of undergoing irreversible degradation downhole. A person skilled in the art, with the benefit of this disclosure, will recognize the types of additives that may be included in the fluids of the present disclosure for a particular application.

The compositions and treatment fluids of the present disclosure may be prepared by any suitable means known in the art. In some embodiments, the treatment fluids may be prepared at a well site or at an offsite location. In certain embodiments, a base fluid may be mixed with the polymer first, among other reasons, in order to allow the polymer to hydrate. Certain components of the fluid may be provided as a dry mix to be combined with fluid or other components prior to or during introducing the fluid into the well. Once prepared, a treatment fluid of the present disclosure may be placed in a tank, bin, or other container for storage and/or transport to the site where it is to be used. In other embodiments, a treatment fluid of the present disclosure may be prepared on-site, for example, using continuous mixing, on-the-fly mixing, or real-time mixing methods. In certain embodiments, these methods of mixing may include methods of combining two or more components wherein a flowing stream of one element is continuously introduced into flowing stream of another component so that the streams are combined and mixed while continuing to flow as a single stream as part of the on-going treatment. The system depicted in FIG. 1 (described below) may be one embodiment of a system and equipment used to accomplish on-the-fly or real-time mixing.

The methods and compositions of the present disclosure may be used during or in conjunction with any operation in a portion of a subterranean formation and/or wellbore, including but not limited to drilling operations, pre-flush treatments, after-flush treatments, hydraulic fracturing treatments, sand control treatments (e.g., gravel packing), "frac-pack" treatments, acidizing treatments (e.g., matrix acidizing or fracture acidizing), well bore clean-out treatments, cementing operations, workover treatments/fluids, and other operations where a treatment fluid may be useful. For example, the methods and/or compositions of the present disclosure may be used in the course of drilling operations in which a well bore is drilled to penetrate a subterranean formation. In certain embodiments, this may be accomplished using the pumping system and equipment used to circulate the drilling fluid in the well bore during the drilling operation, which is described below.

The drilling fluids of the present disclosure may be provided and/or introduced into the well bore or used to drill at least a portion of a well bore in a subterranean formation using any method or equipment known in the art. In certain embodiments, a drilling fluid of the present disclosure may be circulated in the well bore using the same types of pumping systems and equipment at the surface that are used to introduce drilling fluids and/or other treatment fluids or additives into a well bore penetrating at least a portion of the subterranean formation.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

Figure 1:
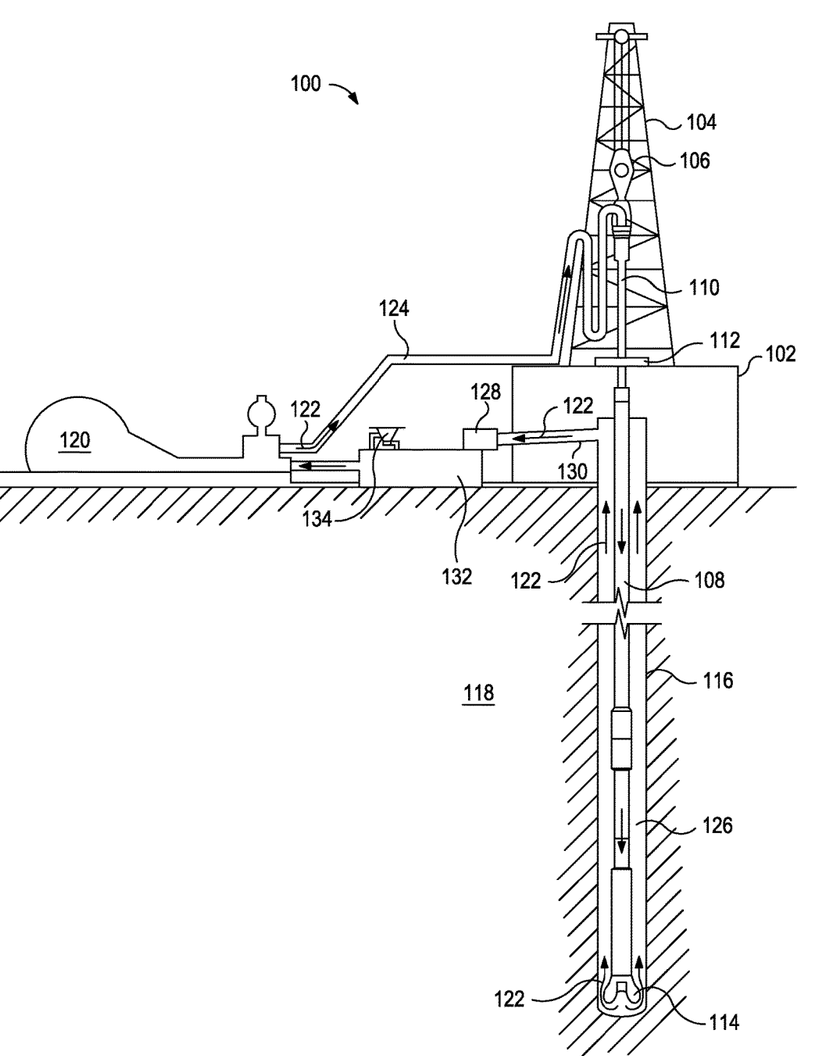
FIG. 1 is a diagram illustrating an example of a well bore drilling assembly that may be used in accordance with certain embodiments of the present disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed additives may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed additives may be stored, reconditioned, and/or regulated until added to the drilling fluid 122.

As mentioned above, the disclosed fluids and additives may directly or indirectly affect the components and equipment of the drilling assembly 100. For example, the disclosed fluids and additives may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, or the like. The fluid processing unit(s) 128 may further include one or more sensors, gauges, pumps, compressors, and the like used store, monitor, regulate, and/or recondition the fluids.

The disclosed methods and compositions may directly or indirectly affect the pump 120, which representatively includes any conduits, pipelines, trucks, tubulars, and/or pipes used to fluidically convey the fluids and additives downhole, any pumps, compressors, or motors (e.g., topside or downhole) used to drive the fluids and additives into motion, any valves or related joints used to regulate the pressure or flow rate of the fluids and additives, and any sensors (i.e., pressure, temperature, flow rate, etc.), gauges, and/or combinations thereof, and the like. The disclosed fluids and additives may also directly or indirectly affect the mixing hopper 134 and the retention pit 132 and their assorted variations.

The disclosed methods and compositions also may directly or indirectly affect the various downhole equipment and tools that may come into contact with the compositions such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed methods and compositions may also directly or indirectly affect any downhole heat exchangers, valves and corresponding actuation devices, tool seals, packers and other wellbore isolation devices or components, and the like associated with the wellbore 116. The disclosed methods and compositions may also directly or indirectly affect the drill bit 114, which may include, but is not limited to, roller cone bits, PDC bits, natural diamond bits, any hole openers, reamers, coring bits, etc.

The disclosed methods and compositions also may directly or indirectly affect the various equipment and/or tools (not shown) used at a well site or in drilling assembly 100 to detect various events, properties, and/or phenomena. Such equipment and/or tools may include, but are not limited to, pressure gauges, flow meters, sensors (e.g., float sensors used to monitor the level of drilling fluid in retention pit 132, downhole sensors, sensors in return flow line 130, etc.), seismic monitoring equipment, logging equipment, and the like.

While not specifically illustrated herein, the disclosed methods and compositions may also directly or indirectly affect any transport or delivery equipment used to convey the compositions to the drilling assembly 100 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

The methods, compositions, and systems of the present disclosure may also be defined with reference to the following statements. These statements should not be read to limit the scope of the disclosure or the claims presented herein.

1. A treatment fluid comprising:
    a base fluid; and
    a crosslinked polymer composition,
   wherein the crosslinked polymer composition comprises:
   (a) one or more polymers that comprise at least one N-vinyl lactam monomeric unit; and
   (b) a crosslinker selected from the group consisting of: an acrylamide-based crosslinker, an acrylate-based crosslinker, an ester-based crosslinker, an amide-based crosslinker, any derivative thereof, and any combination thereof.
2. The fluid of statement 1, wherein the base fluid comprises aqueous fluids, non-aqueous fluids, gases, or any combination thereof.
3. The fluid of statement 1 or 2, wherein the base fluid comprises an aqueous fluid.
4. The fluid of statement 1, 2 or 3, wherein the base fluid comprises a non-aqueous fluid.
5. The fluid of any preceding statement, wherein the base fluid comprises a gas.
6. The fluid of any preceding statement, wherein the base fluid comprises a non-aqueous fluid selected from the group consisting of oils, hydrocarbons, organic liquids, alcohols, (e.g., glycols) and polar solvents.
7. The fluid of any preceding statement, wherein the base fluid comprises an oil.
8. The fluid of any preceding statement, wherein the base fluid comprises a hydrocarbon.
9. The fluid of any preceding statement, wherein the base fluid comprises an organic liquid.
10. The fluid of any preceding statement, wherein the base fluid comprises an alcohol.
11. The fluid of any preceding statement, wherein the alcohol is a glycol.
12. The fluid of any preceding statement, wherein the base fluid comprises a polar solvent.
13. The fluid of any preceding statement, wherein the base fluid comprises an aqueous fluid selected from the group consisting of fresh water, salt water, brine, salt water, seawater, or any combination thereof.
14. The fluid of any preceding statement, wherein the base fluid comprises fresh water.
15. The fluid of any preceding statement, wherein the base fluid comprises salt water.
16. The fluid of any preceding statement, wherein the base fluid comprises salt water.
17. The fluid of any preceding statement, wherein the base fluid comprises seawater.
18. The fluid of any preceding statement, wherein the base fluid comprises a brine.
19. The fluid of statement 18, wherein the brine comprises water with one or more water-soluble salts dissolved therein, wherein the one or more salts are selected from the group of inorganic salts, formate salts, or any combination thereof.
20. The fluid of statement 18 or 19, wherein the brine comprises water with inorganic salts dissolved therein.
21. The fluid of statement 20, wherein the fluid has an aqueous phase having a density greater than about 9 lb/gal.
22. The fluid of statement 21, wherein the fluid has an aqueous phase having a density greater than about 13 lb/gal.
23. The fluid of statement 22, wherein the fluid has an aqueous phase having a density in the range of from about 9 lb/gal to about 19.2 lb/gal.
24. The fluid of statement 18 or 19, wherein the brine comprises water with formate salts dissolved therein.
25. The fluid of statement 24, wherein the fluid has an aqueous phase having a density up to about 19.2 lb/gal.
26. The fluid of statement 25, wherein the fluid has an aqueous phase having a density ranging from about 9 lb/gal up to about 19.2 lb/gal.
27. The fluid of statement 18 or 19, wherein the brine comprises a halide-based brine.
28. The fluid of statement 18 or 19, wherein the brine comprises a divalent brine.
29. The fluid of statement 28, wherein the fluid has an aqueous phase having a density up to about 19.2 lb/gal.
30. The fluid of statement 18 or 19, wherein the brine comprises a monovalent brine.
31. The fluid of statement 30, wherein the fluid has an aqueous phase having a density up to about 12.5 lb/gal.
32. The fluid of any one of statements 20 to 23, wherein the inorganic salts are selected from the group of consisting of: alkali metal halides, ammonium halides, and any combination thereof.
33. The fluid of statement 32, wherein the inorganic salts are alkali metal halides.
34. The fluid of statement 32, wherein the inorganic salts are ammonium halides.
35. The fluid of statement 28 or 29, wherein the inorganic salts are selected from the group consisting of alkaline earth metal halides and zinc halides.
36. The fluid of statement 35, wherein the inorganic salts are alkaline earth metal halides.
37. The fluid of statement 35, wherein the inorganic salts are zinc halides.
38. The fluid of statement 36, wherein the inorganic salts are $CaCl_2$.
39. The fluid of statement 36, wherein the inorganic salts are $CaBr_2$.
40. The fluid of any preceding statement wherein the polymer comprises any polymeric material that comprises at least one N-vinyl lactam monomeric unit.
41. The fluid of any preceding statement wherein the polymer comprises at least one N-vinyl lactam monomeric unit selected from N-vinylpyrrolidone, N-vinylcaprolactam, or derivatives thereof.
42. The fluid of any preceding statement wherein the polymer comprises one N-vinyl lactam monomeric unit.
43. The fluid of any preceding statement wherein the N-vinyl lactam monomeric unit is N-vinylpyrrolidone.
44. The fluid of any preceding statement wherein the N-vinyl lactam monomeric unit is N-vinylcaprolactam.
45. The fluid of any preceding statement wherein the N-vinyl lactam monomeric unit comprises at least about 5 mol % of the monomeric units of the polymer.
46. The fluid of any preceding statement wherein the N-vinyl lactam monomeric units comprise about 20 mol % to about 100 mol % of the monomeric units of the polymer.
47. The fluid of any preceding statement wherein the N-vinyl lactam monomeric units comprise about 30 mol % to about 60 mol % of the monomeric units of the polymer.
48. The fluid of any preceding statement wherein the N-vinyl lactam monomeric units comprise about 30 mol % to less than 50 mol % of the monomeric units of the polymer.
49. The fluid of any preceding statement wherein the polymer further comprises at least one additional monomeric unit selected from the group consisting of: an acrylamide; an N-substituted acrylamide; methacrylamide, an N-substituted methacrylamide; an acrylate; a methacrylate; acrylic acid; methacrylic acid; an N-vinylamide; an N-allylamide; vinyl alcohol; a vinyl ether; a vinyl ester; an allyl alcohol; an allyl ether; an allyl esters; vinylpyridine; a vinyl sulfonate; an allyl sulfonate; vinylimidazole; allylimidazole; diallyldimethylammonium chloride; and any combination thereof.
50. The fluid of statement 49 wherein there is one additional monomeric unit.
51. The fluid of statement 49 or 50 wherein the additional monomeric unit is different to the crosslinker.
52. The fluid of any one of statements 49 to 51, wherein the additional monomeric unit is an acrylamide.
53. The fluid of any one of statements 49 to 52, wherein the additional monomeric unit is an N-substituted acrylamide.
54. The fluid of any one of statements 49 to 53, wherein the additional monomeric unit is methacrylamide.
55. The fluid of any one of statements 49 to 54, wherein the additional monomeric unit is an N-substituted methacrylamide.
56. The fluid of any one of statements 49 to 55, wherein the additional monomeric unit is an acrylate.
57. The fluid of any one of statements 49 to 56, wherein the additional monomeric unit is a methacrylate.
58. The fluid of any one of statements 49 to 57, wherein the additional monomeric unit is acrylic acid.
59. The fluid of any one of statements 49 to 58, wherein the additional monomeric unit is methacrylic acid.
60. The fluid of any one of statements 49 to 59, wherein the additional monomeric unit is an N-vinylamide.
61. The fluid of any one of statements 49 to 60, wherein the additional monomeric unit is an N-allylamide.
62. The fluid of any one of statements 49 to 61, wherein the additional monomeric unit is vinyl alcohol.
63. The fluid of any one of statements 49 to 62, wherein the additional monomeric unit is a vinyl ether.
64. The fluid of any one of statements 49 to 63, wherein the additional monomeric unit is a vinyl ester.
65. The fluid of any one of statements 49 to 64, wherein the additional monomeric unit is an allyl alcohol.
66. The fluid of any one of statements 49 to 65, wherein the additional monomeric unit is an allyl ether.
67. The fluid of any one of statements 49 to 66, wherein the additional monomeric unit is an allyl ester.
68. The fluid of any one of statements 49 to 67, wherein the additional monomeric unit is vinylpyridine.
69. The fluid of any one of statements 49 to 68, wherein the additional monomeric unit is a vinyl sulfonate.
70. The fluid of any one of statements 49 to 69, wherein the additional monomeric unit is an allyl sulfonate.
71. The fluid of any one of statements 49 to 70, wherein the additional monomeric unit is vinylimidazole.
72. The fluid of any one of statements 49 to 71, wherein the additional monomeric unit is allylimidazole.
73. The fluid of any one of statements 49 to 72, wherein the additional monomeric unit is diallyldimethylammonium chloride.
74. The fluid of any one of statements 49 to 73, wherein the additional monomers comprise about 0.1 mol % to about 90 mol % of the monomeric units of the polymer.
75. The fluid of any one of statements 49 to 73, wherein the additional monomers comprise about 10 mol % to about 80 mol % of the monomeric units of the polymer.
76. The fluid of any one of statements 49 to 73, wherein the additional monomers comprise about 20 mol % to about 70 mol % of the monomeric units of the polymer.
77. The fluid of any one of statements 49 to 73, wherein the additional monomers comprise about 40 mol % to about 70 mol % of the monomeric units of the polymer.
78. The fluid of any one of statements 49 to 73, wherein the additional monomers comprise about greater than 50 mol % to about 70 mol % of the monomeric units of the polymer.
79. The fluid of any preceding statement wherein the crosslinker comprises an acrylamide-based crosslinker or a derivative thereof.
80. The fluid of any preceding statement to wherein the crosslinker comprises an acrylamide-based crosslinker.
81. The fluid of any preceding statement wherein the crosslinker comprises an acrylate-based crosslinker or a derivative thereof.
82. The fluid of any preceding statement wherein the crosslinker comprises an acrylate-based crosslinker.
83. The fluid of any preceding statement wherein the crosslinker comprises an ester-based crosslinker or a derivative thereof.
84. The fluid of any preceding statement wherein the crosslinker comprises an ester-based crosslinker.
85. The fluid of any preceding statement wherein the crosslinker comprises an amide-based crosslinker or a derivative thereof.
86. The fluid of any preceding statement wherein the crosslinker comprises at least one crosslinker selected from the group consisting of: N,N'-methylenebisacrylamide; N,N'-methylenebismethacrylamide; N,N'-ethylenebisacrylamide; N,N'-(1,2-dihydroxyethylene)bisacrylamide; 1,4-diacryloylpiperazine; N,N-diallylacrylamide; 1,3,5-triacryloylhexahydro-1,3,5-triazine; and any combination thereof.
87. The fluid of any preceding statement, wherein there is one crosslinker.
88. The fluid of any preceding statement wherein the crosslinker is N,N'-methylenebisacrylamide.
89. The fluid of any preceding statement wherein the crosslinker is N,N'-methylenebismethacrylamide.
90. The fluid of any preceding statement wherein the crosslinker is N,N'-ethylenebisacrylamide.
91. The fluid of any preceding statement wherein the crosslinker is N,N'-(1,2-dihydroxyethylene)bisacrylamide.

92. The fluid of any preceding statement wherein the crosslinker is 1,4-diacryloylpiperazine.
93. The fluid of any preceding statement wherein the crosslinker is N,N-diallylacrylamide.
94. The fluid of any preceding statement wherein the crosslinker is 1,3,5-triacryloylhexahydro-1,3,5-triazine.
95. The fluid of any preceding statement wherein the crosslinker comprises at least one crosslinker selected from the group consisting of: ethylene glycol di(meth)acrylate; propylene glycol di(meth)acrylate; diethylene glycol di(meth)acrylate; polyethylene glycol di(meth)acrylate; 1,4-butanediol di(meth)acrylate; 1,6-hexanediol di(meth)acrylate; 1,1,1-trimethylolpropane trimethacrylate; pentaerythritol tri(meth)acrylate; pentaerythritol tetra(meth)acrylate; glycerol di(meth)acrylate: glycerol tri(meth)acrylate; triglycerol di(meth)acrylate; allyl (meth)acrylate; vinyl (meth)acrylate; tris[2-(acryloyloxy)ethyl]isocyanurate; and any combination thereof.
96. The fluid of any preceding statement, wherein the crosslinker comprises one crosslinker.
97. The fluid of any preceding statement wherein the crosslinker is ethylene glycol di(meth)acrylate.
98. The fluid of any preceding statement wherein the crosslinker is propylene glycol di(meth)acrylate.
98. The fluid of any preceding statement wherein the crosslinker is diethylene glycol di(meth)acrylate.
99. The fluid of any preceding statement wherein the crosslinker is polyethylene glycol di(meth)acrylate.
100. The fluid of any preceding statement wherein the crosslinker is 1,4-butanediol di(meth)acrylate.
101. The fluid of any preceding statement wherein the crosslinker is 1,6-hexanediol di(meth)acrylate.
102. The fluid of any preceding statement wherein the crosslinker is 1,1,1-trimethylolpropane trimethacrylate.
103. The fluid of any preceding statement wherein the crosslinker is pentaerythritol tri(meth)acrylate.
104. The fluid of any preceding statement wherein the crosslinker is pentaerythritol tetra(meth)acrylate.
105. The fluid of any preceding statement wherein the crosslinker is glycerol di(meth)acrylate.
106. The fluid of any preceding statement wherein the crosslinker is glycerol tri(meth)acrylate.
107. The fluid of any preceding statement wherein the crosslinker is triglycerol di(meth)acrylate.
108. The fluid of any preceding statement wherein the crosslinker is allyl (meth)acrylate.
109. The fluid of any preceding statement wherein the crosslinker is vinyl (meth)acrylate.
110. The fluid of any preceding statement wherein the crosslinker is tris[2-(acryloyloxy)ethyl]isocyanurate.
111. The fluid of any preceding statement wherein the crosslinker comprises at least one crosslinker selected from the group consisting of: diallyl carbonate; divinyl adepate; divinyl sebacate; diallyl phthalate; diallyl maleate; diallyl succinate; 1,3,5-triallyl-1,3-5-triazine-2,4,6(1H,3H,5H)-trione; triallyl cyanurate; and any combination thereof.
112. The fluid of any preceding statement wherein the crosslinker comprises one crosslinker.
113. The fluid of any preceding statement wherein the crosslinker is diallyl carbonate.
114. The fluid of any preceding statement wherein the crosslinker is divinyl adepate.
115. The fluid of any preceding statement wherein the crosslinker is divinyl sebacate.
116. The fluid of any preceding statement wherein the crosslinker is diallyl phthalate.
117. The fluid of any preceding statement wherein the crosslinker is diallyl maleate.
118. The fluid of any preceding statement wherein the crosslinker is diallyl succinate.
119. The fluid of any preceding statement wherein the crosslinker is 1,3,5-triallyl-1,3-5-triazine-2,4,6(1H,3H,5H)-trione.
120. The fluid of any preceding statement wherein the crosslinker is triallyl cyanurate.
121. The fluid of statement 49 or any statement dependent on statement 49 wherein the crosslinker is present in a concentration of from about 0.05 mol % to 5 mol % of a total of the N-vinyl lactam monomeric units and additional monomeric units of the polymer.
122. The fluid of statement 121 wherein the crosslinker is present in a concentration of from about 0.1 mol % to 3 mol % of a total of the N-vinyl lactam monomeric units and additional monomeric units of the polymer.
123. The fluid of statement 122 wherein the crosslinker is present in a concentration of from about 0.5 mol % to 2 mol % of a total of the N-vinyl lactam monomeric units and additional monomeric units of the polymer.
124. The fluid of any preceding statement wherein the crosslinked polymer composition further comprises at least one additional crosslinker selected from the group consisting of: divinyl ether, diallyl ether, a vinyl or allyl ether of a polyglycol or polyol, allyl sucrose, ethylene glycol divinyl ether, triethylene glycol divinyl ether, diethylene glycol divinyl ether, glycerol diallyl ether, polyethylene glycol divinyl ether, propylene glycol divinyl ether, trimethylolpropane diallyl ether, pentaerythritol allyl ether, divinylbenzene, 1,3-divinylimidazolidin-2-one, divinyltetrahydropyrimidin-2(1H)-one, a diene, an allyl amine, N-vinyl-3(E)-ethylidene pyrrolidone, ethylidene bis(N-vinylpyrrolidone), and any combination thereof.
125. The fluid of statement 124, wherein there is one additional crosslinker.
126. The fluid of statement 124 or 125 wherein the additional crosslinker is divinyl ether.
127. The fluid of any one of statements 124 to 126 wherein the additional crosslinker is diallyl ether.
128. The fluid of any one of statements 124 to 127 wherein the additional crosslinker is a vinyl or allyl ether of a polyglycol or polyol.
129. The fluid of any one of statements 124 to 128 wherein the additional crosslinker is allyl sucrose.
130. The fluid of any one of statements 124 to 129 wherein the additional crosslinker is ethylene glycol divinyl ether.
131. The fluid of any one of statements 124 to 130 wherein the additional crosslinker is triethylene glycol divinyl ether.
132. The fluid of any one of statements 124 to 131 wherein the additional crosslinker is diethylene glycol divinyl ether.
133. The fluid of any one of statements 124 to 132 wherein the additional crosslinker is glycerol diallyl ether.
134. The fluid of any one of statements 124 to 133 wherein the additional crosslinker is polyethylene glycol divinyl ether.
135. The fluid of any one of statements 124 to 134 wherein the crosslinker is propylene glycol divinyl ether.
136. The fluid of any one of statements 124 to 135 wherein the crosslinker is trimethylolpropane diallyl ether.
137. The fluid of any one of statements 124 to 136 wherein the additional crosslinker is pentaerythritol allyl ether.

138. The fluid of any one of statements 124 to 137 wherein the additional crosslinker is divinylbenzene.
139. The fluid of any one of statements 124 to 138 wherein the additional crosslinker is 1,3-divinylimidazolidin-2-one.
140. The fluid of any one of statements 124 to 139 wherein the additional crosslinker is divinyltetrahydropyrimidin-2(1H)-one.
141. The fluid of any one of statements 124 to 140 wherein the additional crosslinker is a diene.
142. The fluid of statement any one of statements 124 to 141 wherein the additional crosslinker is an allyl amine.
143. The fluid of any one of statements 124 to 142 wherein the additional crosslinker is N-vinyl-3(E)-ethylidene pyrrolidone.
144. The fluid of any one of statements 124 to 143 wherein the additional crosslinker is ethylidene bis (N-vinylpyrrolidone).
145. A fluid of any preceding statement, further comprising one or more additional additives in combination with the crosslinked polymer composition.
146. A fluid of statement 145, wherein the or each additional additive are selected from the group consisting of weighting agents, surfactants, emulsifiers, acids, fluorides, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, dispersants, flocculants, additional $H_2S$ scavengers, $CO_2$ scavengers, oxygen scavengers, lubricants, viscosifiers, breakers, relative permeability modifiers, resins, particulate materials (e.g., proppant particulates), wetting agents, coating enhancement agents, filter cake removal agents and additional viscosifying agents.
147. A fluid of statement 145 or 146 wherein the or each additional additive comprises degradable materials that are capable of undergoing irreversible degradation downhole.
148. The fluid of statement 145, 146 or 147 wherein the additional additive is a bridging agent.
149. The fluid of statement 1, wherein the N-vinyl lactam monomeric unit is N-vinylpyrrolidone and the crosslinker is N,N'-methylenebisacrylamide.
150. The fluid of statement 149, wherein the polymer further comprises an additional monomeric unit that is acrylamide.
151. The fluid of statement 149 or 150, wherein the base fluid is brine.
152. The fluid of statement 151, wherein the brine is part of a drill-in mud formulation.
153. A fracturing fluid comprising a treatment fluid as defined in any preceding statement and optionally further comprising a mixture of one or more fluids and/or gases.
154. The fracturing fluid of claim 153, wherein the or each fluids and/or gases include emulsions and foams.
155. A drilling fluid comprising a treatment fluid as defined in any one of statements 1 to 152.
156. A method comprising:
 introducing a treatment fluid into at least a portion of a wellbore penetrating at least a portion of a subterranean formation, wherein the treatment fluid is as defined in any one of statements 1 to 152.
157. The method of statement 156 further comprising introducing the treatment fluid into the well bore using one or more pumps and a drillstring.
158. The method of statement 156 or 157 wherein the method is used during or in conjunction with any operation in a portion of a subterranean formation and/or wellbore, wherein the operation is selected from drilling operations, pre-flush treatments, after-flush treatments, hydraulic fracturing treatments, sand control treatments (e.g., gravel packing), "frac-pack" treatments, acidizing treatments (e.g., matrix acidizing or fracture acidizing), well bore clean-out treatments, cementing operations, and workover treatments.
159. The method of any one of statements 156 to 158, wherein the treatment fluid directly or indirectly affects one or more components or pieces of equipment associated with the preparation, delivery, recapture, recycling, reuse, and/or disposal of the treatment fluid.
160. The method of any one of statements 156 to 159, wherein the treatment fluid directly or indirectly affects one or more components or pieces of equipment associated with a wellbore drilling assembly.
161. The method of any one of statements 156 to 160, wherein the treatment fluid directly or indirectly affects the downhole equipment and tools that come into contact with the treatment fluid.
162. The method of any one of statements 156 to 161 wherein the treatment fluid directly or indirectly affects the drill bit.
163. The method of any one of statements 156 to 162, wherein the treatment fluid directly or indirectly affects the equipment and/or tools used at a well site or in drilling assembly to detect various events, properties, and/or phenomena.
164. The method of any one of statements 156 to 163, wherein the treatment fluid directly or indirectly affects any transport or delivery equipment used to convey the treatment fluid to the drilling assembly.
165. A method of any one of statements 156 to 164 wherein the treatment fluid is a drilling fluid and the method comprises:
 providing the drilling fluid; and
 using the drilling fluid to drill at least a portion of a well bore penetrating at least a portion of a subterranean formation.

To facilitate a better understanding of the present disclosure, the following examples of certain aspects of preferred embodiments are given. The following examples are not the only examples that could be given according to the present disclosure and are not intended to limit the scope of the disclosure or claims.

EXAMLES

Polymer Synthesis

In this example, a sample of a crosslinked N-vinylpyrrolidone and acrylamide copolymer was prepared by precipitation polymerization in tert-butanol. To a 300 mL three-neck flask was added 10.53 g of acrylamide (0.148 mol), 10.97 g of N-vinylpyrrolidone (0.099 mol), 0.57 g of methylenebisacrylamide (MBAM, 0.00370 mol), and 190 mL of tert-butanol. A non-crosslinked sample of that copolymer was also prepared in a similar manner, except that no methylenebisacrylamide was added. The solutions were purged with $N_2$ gas for about 30 minutes while heating to 65° C. Azobisisobutyronitrile (AIBN, 0.04 g in 3 mL of ethanol) was added into each solution. The reaction mixtures were stirred at 65° C. for 3 hours, then at 80° C. for additional 1 hour. The mixtures were then cooled down to room temperature and the precipitates were filtered to give a fluffy white powder, which was dried under vacuum at 70° C. overnight.

Polymer Evaluation

The crosslinked and non-crosslinked polymers were evaluated with a drill-in mud formulation as shown in Table 1, which has a brine density of about 9.8 ppg and a mud density of about 10.3 ppg, wherein various crosslinked polymers were used, as described in the following examples. The trademarked products are commercially available from Halliburton Energy Services, Inc. It should be understood that the formulation shown in Table 1 is merely one example of many types of fluids that can be made according to the present disclosure.

TABLE 1

Brine-based drill-in mud formulation (10.3 ppg)

| Formulation | Amount (US Customary Units) | Amount (Metric Units) |
|---|---|---|
| Water | 0.914 bbl | 320 ml |
| NaCl | 59 lb | 59 g |
| KCl | 20 lb | 20 g |
| BARABRINE ® DEFOAM defoamer | 0.20 lb | 0.20 g |
| Polymer | 8.0 lb | 8.0 g |
| BARABUF ® buffer | 1.0 lb | 1.0 g |
| BARACARB ® 5 sized bridging agent | 32.0 lb | 32.0 g |
| BARACARB ® 25 sized bridging agent | 8.0 lb | 8.0 g |
| K-34 ™ pH buffer | 3.76 lb | 3.76 g |
| Oxygen scavenger | 1.0 lb | 1.0 g |

The drill-in muds according to the formula in Table 1 were hot-rolled at 65.5° C. (150° F.) for 16 hours. Rheology data before and after hot rolling was obtained at 49° C. (120° F.) with FANN™ Model 35 viscometer. API Fluid loss after hot rolling was measured on filter paper at room temperature and with 100 psi differential pressure.

Table 2 shows the fluid properties for a 40:60 NVP/AM copolymer with or without the MBAM crosslinker. The data in Table 2 demonstrates that the non-crosslinked copolymer does not significantly viscosify the brine or provide any fluid loss control. On the other hand, the copolymer crosslinked with MBAM provides higher viscosity than the non-crosslinked copolymer. The drill-in fluid with the crosslinked polymer also exhibit better fluid loss control, with an API fluid loss of only 8.2 mL.

TABLE 2

Comparison of fluid properties for crosslinked and non-crosslinked copolymer

| | NVP/AM Molar Ratio | | | |
|---|---|---|---|---|
| | 40/60 | | 40/60 | |
| | Crosslinker | | | |
| | None | | MB AM | |
| | Crosslinker mol % | | | |
| | 0 | | 1.5 | |
| | Hot-roll temperature | | | |
| | 65.5° C. (150° F.) | — | 65.5° C. (150° F.) | — |
| Rheology at 49° C. (120° F.) before and after hot-rolling for 16 hours | | | | |
| 600 rpm, lb/100 ft² | 17 | 15 | 68 | 70 |
| 300 rpm, lb/100 ft² | 9 | 8 | 47 | 58 |
| 200 rpm, lb/100 ft² | 6 | 6 | 35 | 50 |
| 100 rpm, lb/100 ft² | 4 | 3 | 27 | 40 |
| 6 rpm, lb/100 ft² | 1 | 1 | 12 | 20 |
| 3 rpm, lb/100 ft² | 1 | 1 | 9 | 18 |
| 10 sec gel, lb/100 ft² | 1 | 1 | 16 | 17 |
| 10 min gel, lb/100 ft² | 1 | 1 | 18 | 17 |
| PV, cP | 8 | 7 | 21 | 12 |
| Yield Point, lb/100 ft² | 1 | 1 | 26 | 46 |
| API fluid loss after 30 minutes, 100 psi differential pressure | | | | |
| Filtrate volume, ml | — | No control | — | 8.2 |

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
    providing a drilling fluid that comprises a halide-based brine base fluid and a crosslinked polymer composition comprising
        at least one homopolymer that comprises at least one N-vinyl lactam monomeric unit,
    and
        at least one crosslinker selected from the group consisting of: an acrylamide-based crosslinker, an acrylate-based crosslinker, an ester-based crosslinker, an amide-based crosslinker, any derivative thereof, and any combination thereof; and using the drilling fluid to drill at least a portion of a well bore penetrating at least a portion of a subterranean formation.

2. The method of claim 1 wherein the crosslinker comprises an acrylamide-based crosslinker.

3. The method of claim 1 wherein the homopolymer comprises polyvinylpyrrolidone.

4. The method of claim 1 wherein the halide based brine base fluid has a density of from about 9 lb/gal to about 19.2 lb/gal.

5. The method of claim 1 wherein the halide based brine base fluid has a density of greater than 13 lb/gal.

6. A method comprising:
providing a drilling fluid that comprises a divalent brine base fluid and a crosslinked polymer composition comprising
at least one homopolymer that comprises at least one N-vinyl lactam monomeric unit, and
at least one crosslinker selected from the group consisting of: an acrylamide-based crosslinker, an acrylate-based crosslinker, an ester-based crosslinker, an amide-based crosslinker, any derivative thereof, and any combination thereof; and using the drilling fluid to drill at least a portion of a well bore penetrating at least a portion of a subterranean formation.

7. The method of claim 6 wherein the crosslinker comprises an acrylamide-based crosslinker.

8. The method of claim 6 wherein the homopolymer comprises polyvinylpyrrolidone.

9. The method of claim 6 wherein the divalent brine base fluid has a density of from about 9 lb/gal to about 19.2 lb/gal.

10. The method of claim 6 wherein the divalent brine base fluid has a density of greater than 13 lb/gal.

11. The method of claim 1 wherein a design temperature of the portion of the well bore is at least 149° C. (300° F.).

* * * * *